United States Patent
Bauer et al.

(10) Patent No.: US 12,400,347 B2
(45) Date of Patent: Aug. 26, 2025

(54) AUTOMATED UPDATE OF GEOMETRICAL DIGITAL REPRESENTATION

(71) Applicant: FARO Technologies, Inc., Lake Mary, FL (US)

(72) Inventors: Heiko Bauer, Moeglingen (DE); Tobias Boehret, Aidlingen (DE); Denis Wohlfeld, Ludwigsburg (DE)

(*) Notice: Subject to any disclaimer, the term of this patent is extended or adjusted under 35 U.S.C. 154(b) by 595 days.

(21) Appl. No.: 17/750,551

(22) Filed: May 23, 2022

(65) Prior Publication Data
US 2022/0392091 A1 Dec. 8, 2022

Related U.S. Application Data

(60) Provisional application No. 63/195,765, filed on Jun. 2, 2021.

(51) Int. Cl.
| | |
|---|---|
| *G06T 7/521* | (2017.01) |
| *G01S 17/89* | (2020.01) |
| *G06T 7/70* | (2017.01) |

(52) U.S. Cl.
CPC .............. *G06T 7/521* (2017.01); *G01S 17/89* (2013.01); *G06T 7/70* (2017.01); *G06T 2207/30204* (2013.01)

(58) Field of Classification Search
None
See application file for complete search history.

(56) References Cited

U.S. PATENT DOCUMENTS

| | | | |
|---|---|---|---|
| 8,705,012 B2 | 4/2014 | Greiner et al. | |
| 10,360,727 B2 | 7/2019 | Kirk et al. | |
| 10,984,240 B2 | 4/2021 | Wohlfeld et al. | |
| 2016/0291160 A1* | 10/2016 | Zweigle | G01S 7/4813 |
| 2019/0086514 A1* | 3/2019 | Dussan | G01S 7/4817 |
| 2021/0183081 A1 | 6/2021 | Wohlfeld et al. | |
| 2021/0374978 A1 | 12/2021 | Döring et al. | |
| 2022/0318540 A1 | 10/2022 | Wohlfeld et al. | |

FOREIGN PATENT DOCUMENTS

WO 2019216937 A2 11/2019

OTHER PUBLICATIONS

European Search Report; Issued: Nov. 11, 2022; Application No. 22175601.8; Filed: May 26, 2022; 8 pages.

\* cited by examiner

*Primary Examiner* — Andrew H Lam
(74) *Attorney, Agent, or Firm* — McCarter & English, LLP; Dave S. Christensen

(57) ABSTRACT

A method for updating a digital representation of an environment includes capturing an image of a portion of the environment using a change-detection device. Further, a corresponding digital data is determined that represents the portion in the digital representation of the environment. A change in the portion is detected by comparing the image with the corresponding digital data. In response to the change being above a predetermined threshold, the method includes initiating a resource-intensive scan of the portion using a scanning device, and updating the digital representation of the environment by replacing the corresponding digital data representing the portion with the resource-intensive scan.

22 Claims, 15 Drawing Sheets

AUTOMATED UPDATE OF GEOMETRICAL DIGITAL REPRESENTATION

CROSS REFERENCE TO RELATED APPLICATIONS

This application claims the benefit of U.S. Provisional Application Ser. No. 63/195,765, filed Jun. 2, 2021, the entire disclosure of which is incorporated herein by reference.

BACKGROUND

The subject matter disclosed herein relates to use of measuring devices, such as a 3D laser scanner time-of-flight (TOF) coordinate measurement device, and in particular to automatically updating a geometrical digital representation of an environment using such measuring devices.

Typically, a geometrical digital representation of an environment, such as a factory, a warehouse, a construction site, an office building, a home, or any other type of environment is captured using one or more measurement devices. The geometrical digital representation includes representation of various features, such as objects, walls, corners, doors, windows, pipes, wires, reference points, and any other such aspects of the environment. The geometrical digital representation includes point clouds, scans, images, annotations, and other data captured by one or more measurement devices. The measuring devices can include TOF 3D laser scanners, two-dimensional (2D) scanners, cameras (such as, photogrammetry camera, wide-angle camera, mobile device, or any other image capturing device), lidar, radars, or other types of measuring devices.

A measuring device such as the TOF 3D laser scanner steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or any other angle transducer). The beam steering mechanism also includes a second motor that steers the beam of light about a second axis by a second angle that is measured by a second angular encoder (or any other angle transducer).

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three-color values (such as red, green, blue "RGB") are collected for each data point.

Reference systems provide a link between a digital world and real world using the measuring devices. The digital world includes the geometrical digital representations of the environment. For example, the reference systems can use measuring targets within an environment that can be used for planning updates to the environment. Reference systems are used to measure an environment, e.g., a building, factory or any other environment, which can be used for planning/envisioning updates to the building or factory.

Accordingly, while existing reference systems are suitable for their intended purposes, what is needed is a reference system that provides an automated update between a real-world environment and the digital representations of the environment.

BRIEF DESCRIPTION

According to one or more embodiments, a system for updating a digital representation of an environment includes a change-detection device having a camera, and one or more processors responsive to executable computer instructions to perform a method. The method includes capturing an image of a portion of the environment using the change-detection device. The method further includes determining a corresponding digital data representing the portion in the digital representation of the environment. The method further includes detecting a change in the portion by comparing the image with the corresponding digital data. The method further includes in response to the change being above a predetermined threshold, initiating a resource-intensive scan of the portion using a scanning device, and updating the digital representation of the environment by replacing the corresponding digital data representing the portion with the resource-intensive scan.

A method for updating a digital representation of an environment includes capturing an image of a portion of the environment using a change-detection device. The method further includes determining a corresponding digital data representing the portion in the digital representation of the environment. The method further includes detecting a change in the portion by comparing the image with the corresponding digital data. The method further includes in response to the change being above a predetermined threshold, initiating a resource-intensive scan of the portion using a scanning device, and updating the digital representation of the environment by replacing the corresponding digital data representing the portion with the resource-intensive scan.

According to one or more embodiments, the digital representation of the environment comprises 3D coordinate points on surfaces of the environment.

According to one or more embodiments, determining the corresponding digital data comprises locating one or more landmarks in the environment captured within the image.

According to one or more embodiments, the one or more landmarks include a marker installed in the environment. According to one or more embodiments, the marker is a quick response (QR) code.

According to one or more embodiments, determining the corresponding digital data representing the portion in the digital representation of the environment includes simulating a first panoramic image of the portion from a location of the change-detection device using the digital representation of the environment, and comparing the first panoramic image with the image from the change-detection device.

According to one or more embodiments, initiating the resource-intensive scan of the portion includes sending a notification that includes a position in the environment, and an orientation, wherein the resource-intensive scan of the portion is to be captured by the scanning device from said position using said orientation.

According to one or more embodiments, the notification further includes identification of one or more landmarks to be captured in the resource-intensive scan to register the resource-intensive scan with the digital representation.

According to one or more embodiments, the resource-intensive scan is performed by an operator in response to receiving a notification from the one or more processors.

According to one or more embodiments, the resource-intensive scan is performed autonomously by a robot in response to receiving a notification from the one or more processors.

According to one or more embodiments, the change-detection device is a photogrammetry camera or a camera associated with a mobile phone.

In one or more embodiments, the environment is a factory or building. The digital representation is used to layout/place equipment in the factory or building.

In one or more embodiments, the marker includes a predetermined label that is captured in the image. The label is captured using a survey instrument in some embodiments.

In one or more embodiments, the marker includes a reflective surface that is captured in the image using. The reflective surface facilitates using photogrammetry to analyze the image and determining one or more attributes of the captured portion in some embodiments.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

The technical solutions described herein relates to measuring an environment using one or more measuring devices and automatically updating a digital geometric representation of the environment. Embodiments of the technical solutions described herein provide advantages localizing a mobile photographic device, such as a cellular phone, within the environment and based on identifying one or more features, such as semantic landmarks, markers placed within the environment and their positions in a point cloud generated by the 3D measuring device. Embodiments of the technical solutions provide advantages in providing a layout and/or placement of equipment within the environment. Embodiments of the invention provide still further advantages in updating geometric digital representations using a mobile photographic device.

Figure 1:
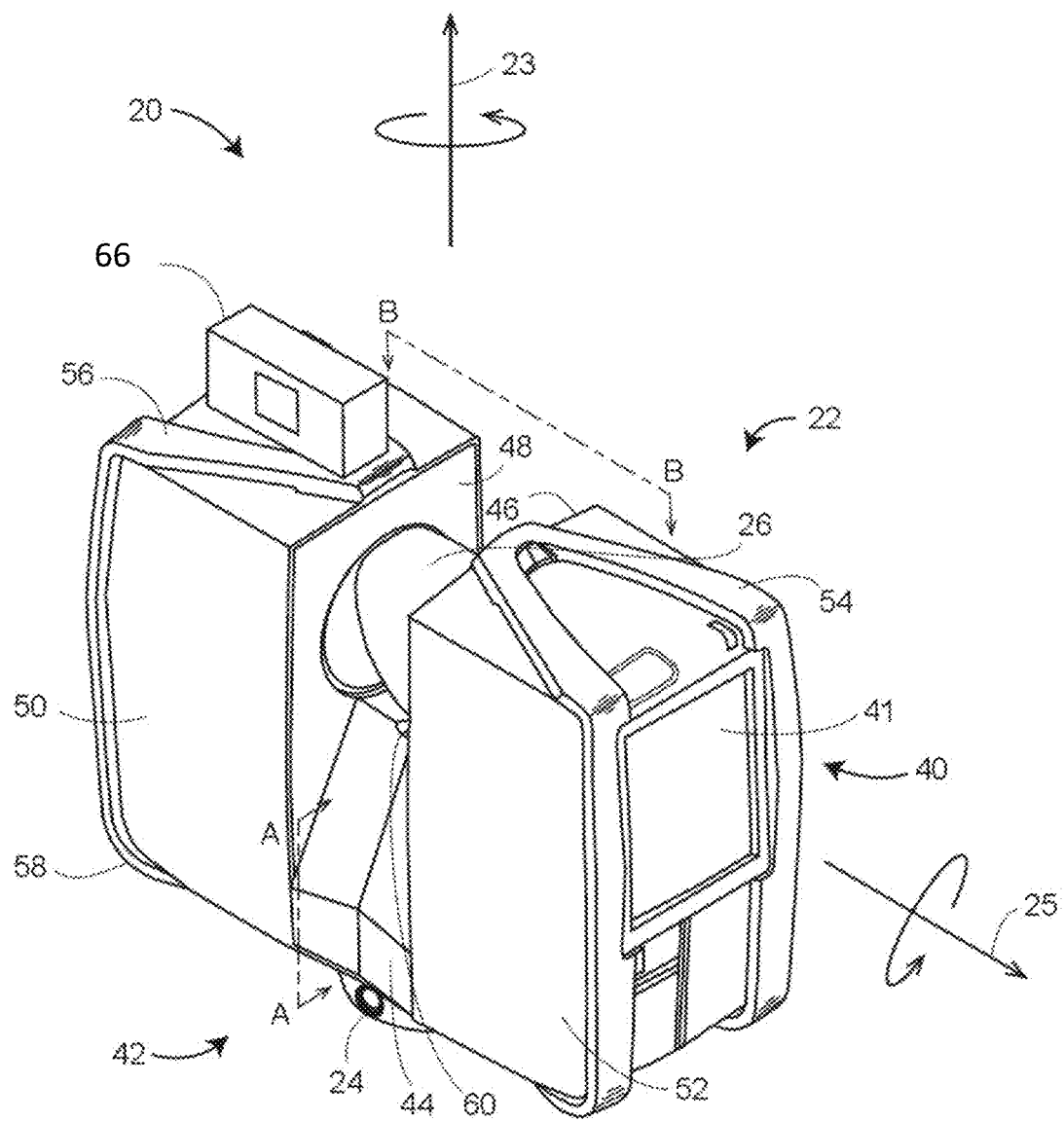
FIG. 1 is a perspective view of a laser scanner in accordance with an embodiment of the invention.
Figure 2:
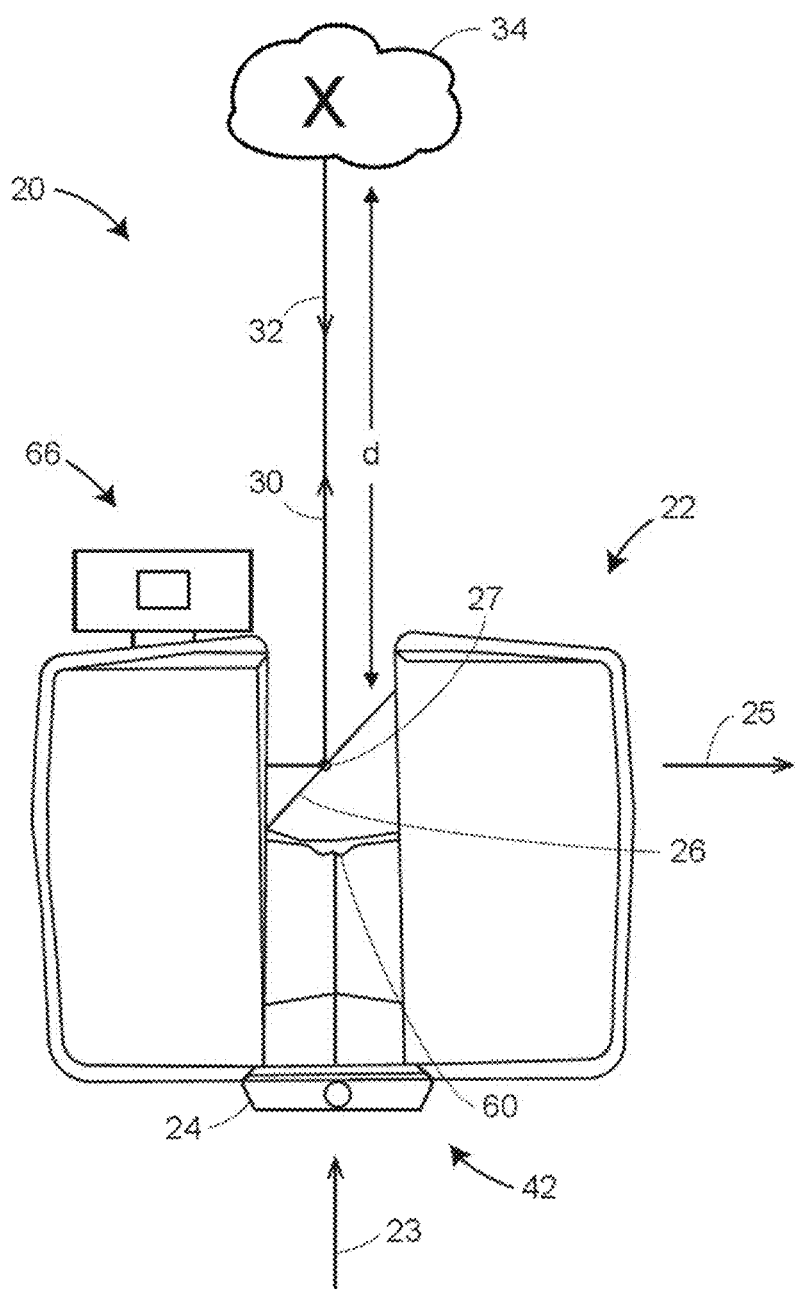
FIG. 2 is a side view of the laser scanner illustrating a method of measurement according to an embodiment.
Figure 3:
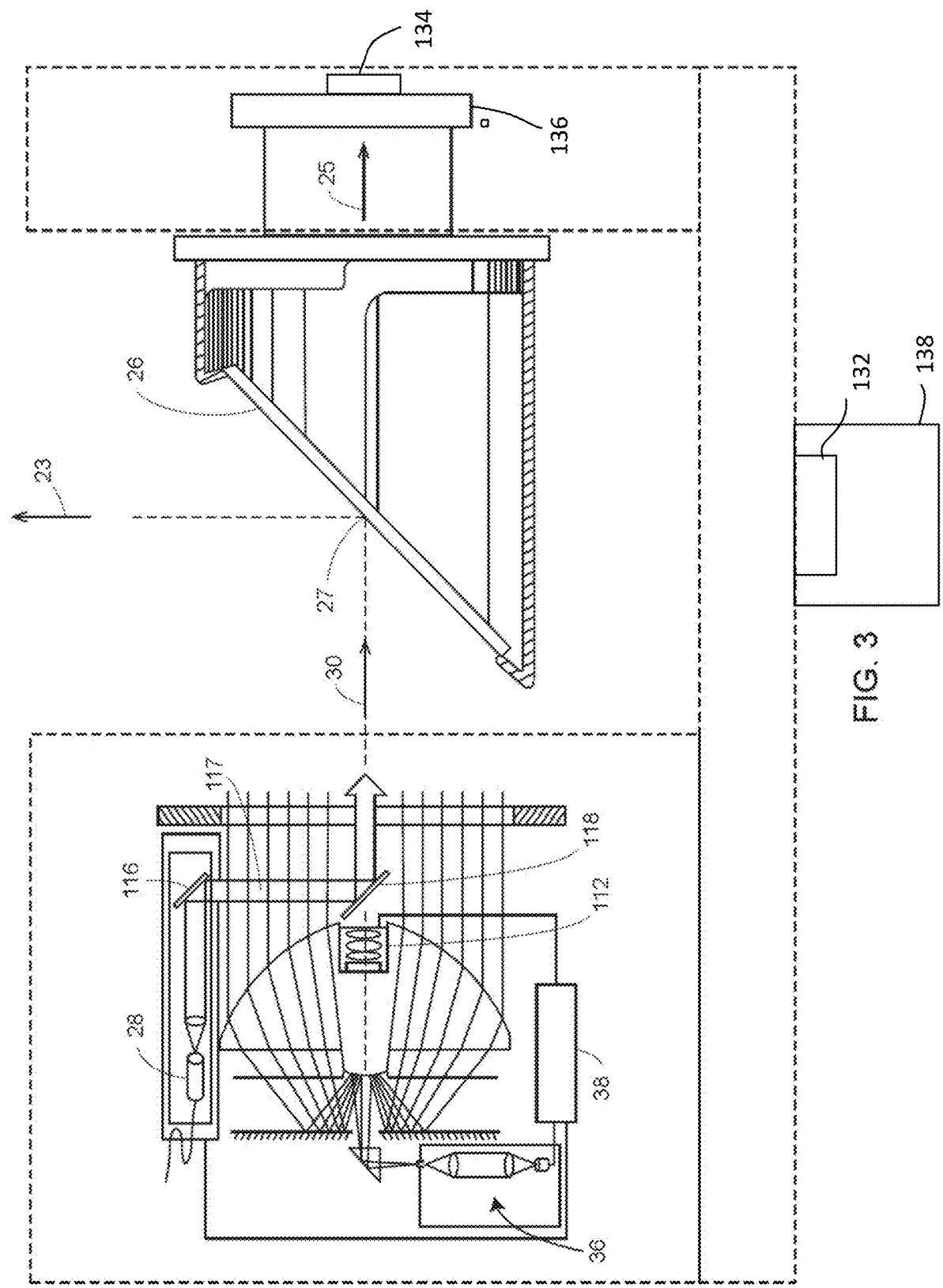
FIG. 3 is a schematic illustration of the optical, mechanical, and electrical components of the laser scanner according to an embodiment.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment, the phase shift of modulation in light emitted by the laser scanner 20 and the point X is determined and evaluated to obtain a measured distance d.

As used herein TOF scanners may use a variety of methods for determining the distance d. These methods may include modulating the emitted light (e.g., sinusoidally) and measuring the phase shift of the returning light (phase-based scanners), or measuring the time interval between the emitted and returning light pulses (pulse-based scanners). The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. It should be appreciated that while embodiments herein may refer to a phase-shift type TOF scanner, this is for example purposes and the claims should not be so limited. A method of measuring distance based on the time-of-flight of light (whether phase or pulse based) depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
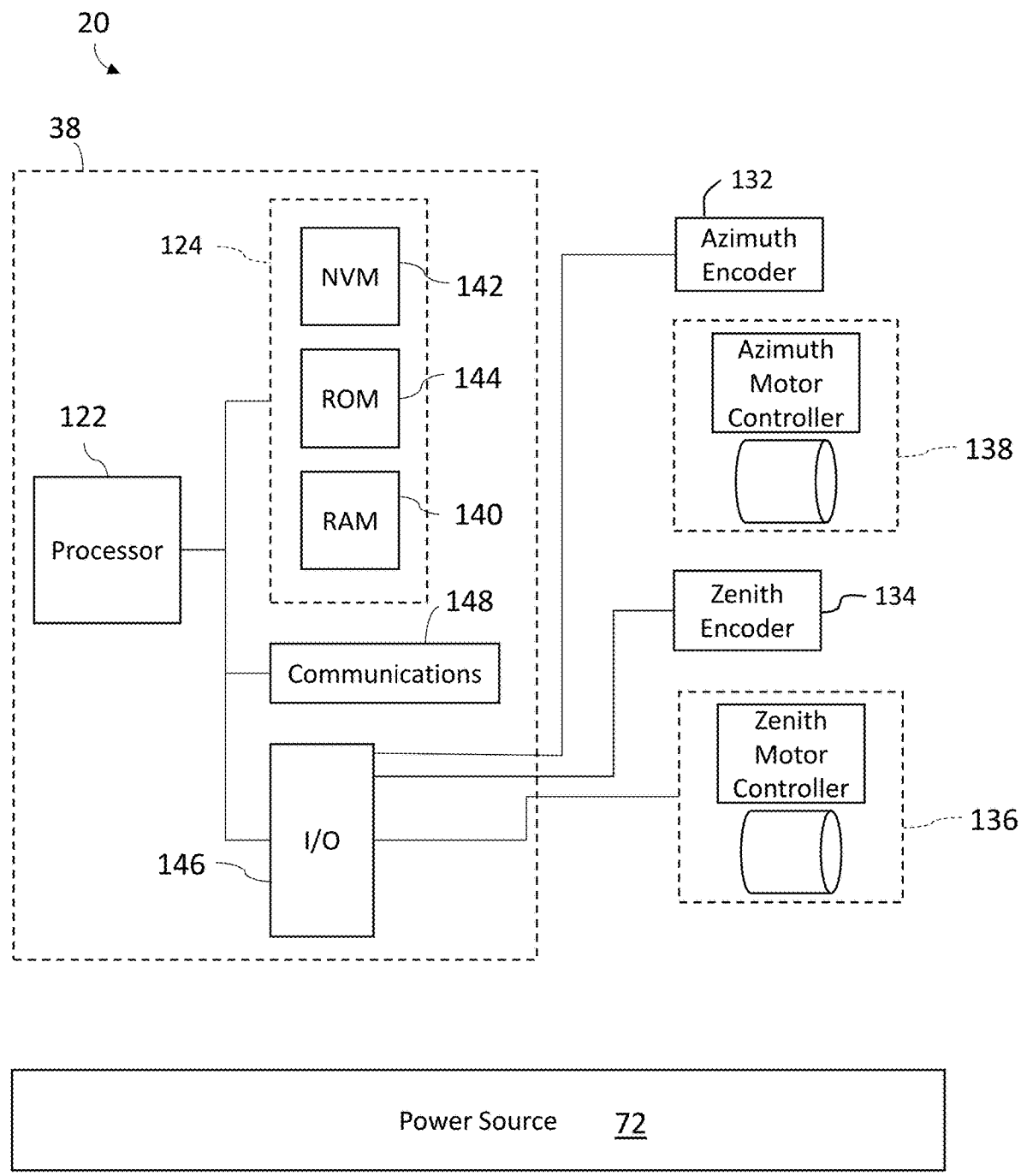
FIG. 4 illustrates a schematic illustration of the laser scanner of FIG. 1 according to an embodiment.

Referring now to FIG. 4 with continuing reference to FIGS. 1-3, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by panoramic camera 126, angular/rotational measurements by a first or azimuth encoder 132, and angular/rotational measurements by a second axis or zenith encoder 134.

In general, controller 38 accepts data from encoders 132, 134, light receiver 36, light source 28, and panoramic camera 126 and is given certain instructions for the purpose of generating a 3D point cloud of a scanned environment. Controller 38 provides operating signals to the light source 28, light receiver 36, panoramic camera 126, zenith motor 136 and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 140 may be one or more LEDs (light-emitting diodes) 82, an LCD (liquid-crystal diode) display, a CRT (cathode ray tube) display, a touch-screen display or the like. A keypad may also be coupled to the user interface for providing data input to controller 38. In one embodiment, the user interface is arranged or executed on a mobile computing device that is coupled for communication, such as via a wired or wireless communications medium (e.g., Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet(ˆ) Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 92 provides an interface that allows wireless or wired communication with one or more external devices or networks, such as the LAN discussed above.

Controller 38 includes operation control methods embodied in application code. These methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hyper-Text Markup Language), Python, Ruby and any combination or derivative of at least one of the foregoing.

Figure 5A:
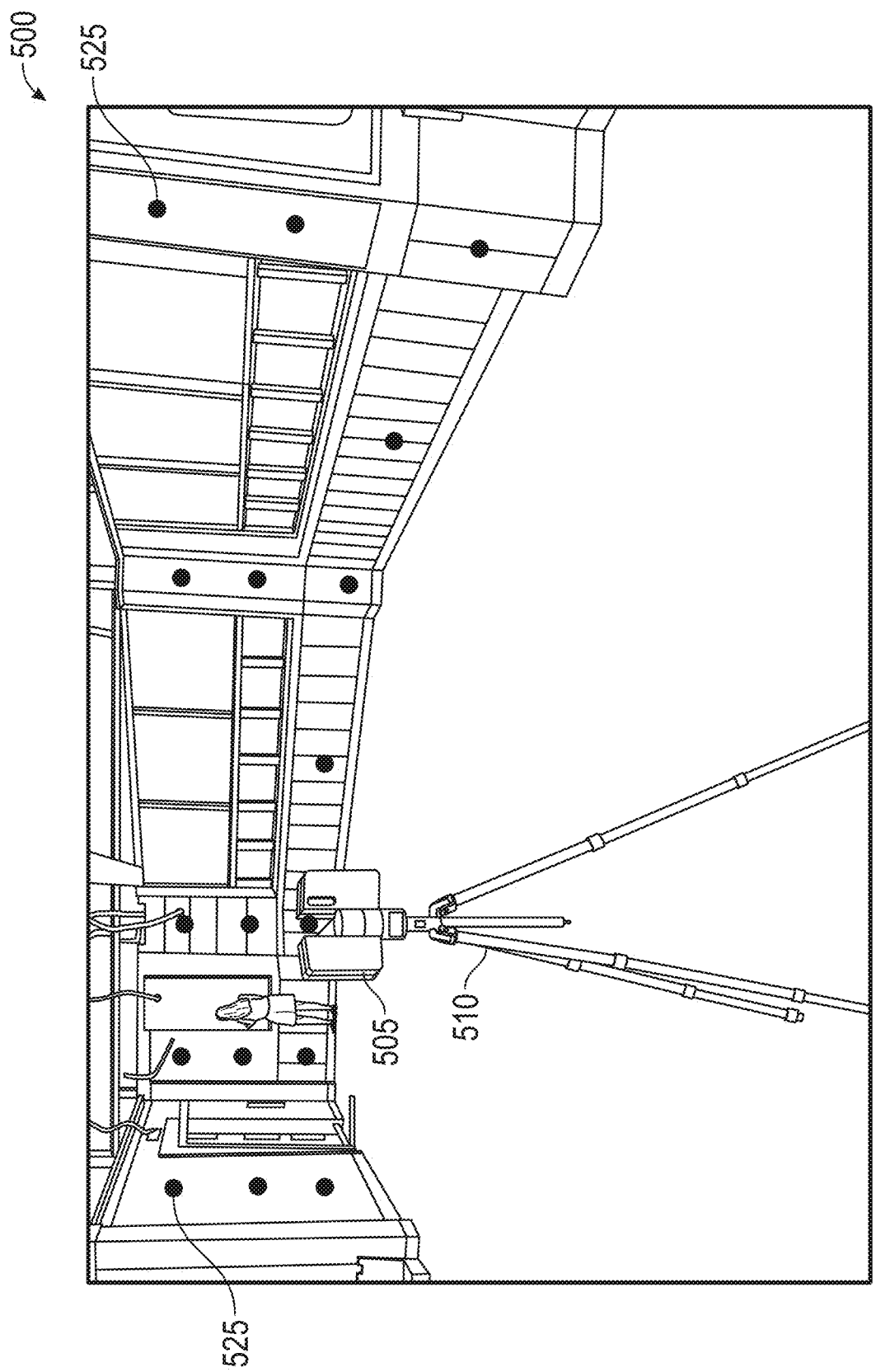
FIG. 5A illustrates a schematic illustration of the laser scanner of FIG. 1 measuring an environment according to an embodiment.

FIG. 5A illustrates an environment 500 in which a laser scanner is utilized to make measurements according to an embodiment. A laser scanner 505, which can be the laser scanner of FIG. 1, can be placed at one or more designated locations within the environment 500. The laser scanner 505 can be placed on a tripod 510 having a pan-tilt axis, or can be utilized without using the tripod 510. The laser scanner 505 may also be placed on a movable platform, cart, or dolly. For example, the laser scanner 505 can also be installed on a factory/building ceiling and linked to a digital platform. Multiple laser scanners 505 can be used to measure environment 500. The measurement of the environment 500 results in the generation of an electronic model comprising a collection of 3D coordinate points on surfaces of the environment. This collection of 3D coordinate points is sometimes referred to as a point cloud.

Figure 6:
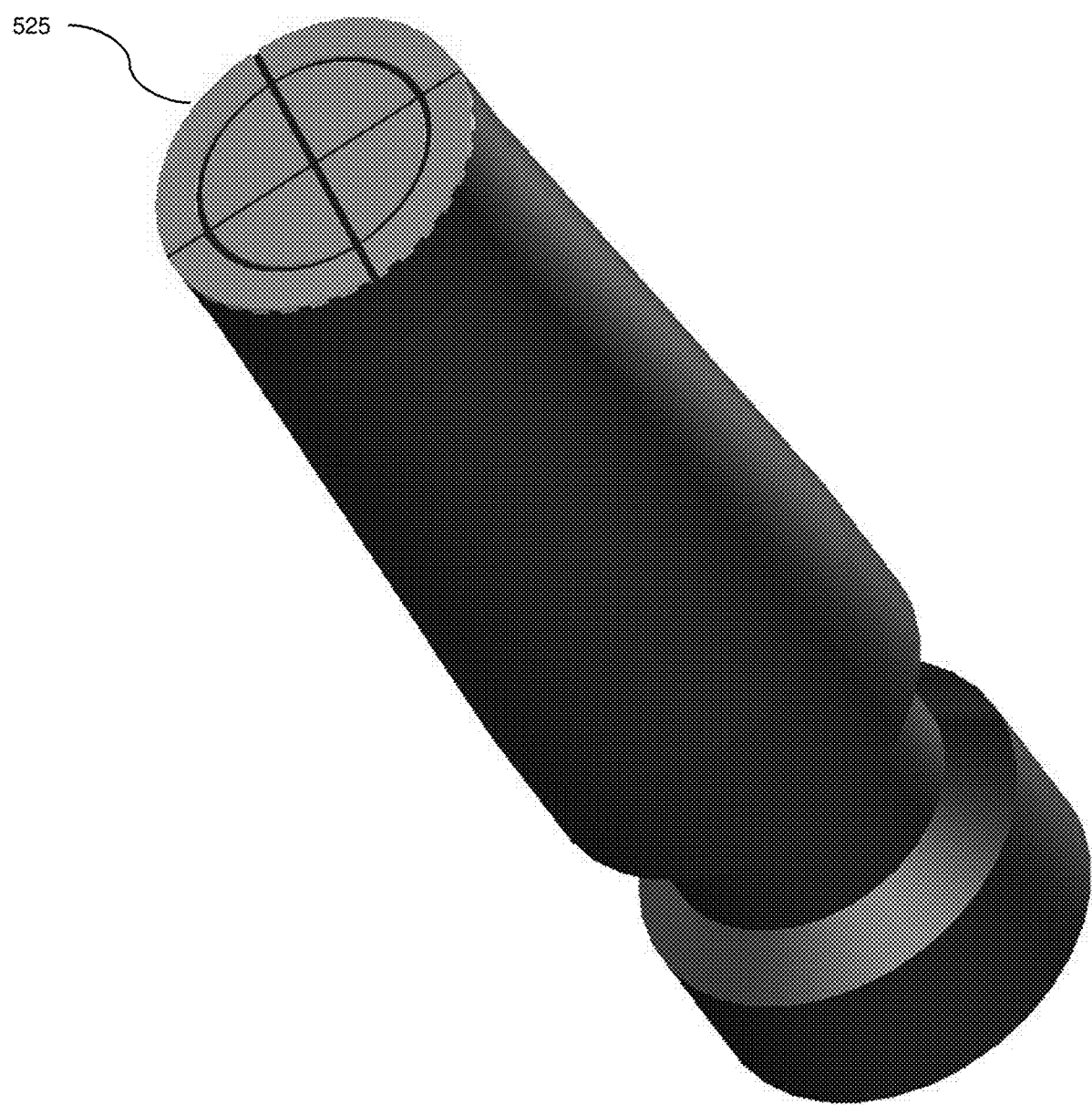
FIG. 6 illustrates an exemplary marker of FIGS. 5A and 5B according to an embodiment.

One or more targets or markers (markers) 525 (additionally illustrated in FIG. 6) can be placed at locations with the environment 500. The one or more markers 525 can be recognized by the laser scanner 505. The one or more markers 525 can each have an associated Quick Response (QR) code with a unique identifier (relative to other markers placed within the environment). The location of the markers 525 may be identified with a desired level of accuracy based on the scan of the environment 500 be the laser scanner 505. It should be appreciated that where a higher level of accuracy is desired, the locations of the markers 525 may be measured using another 3D measurement device, such as a laser tracker or a total station for example.

Figure 12:
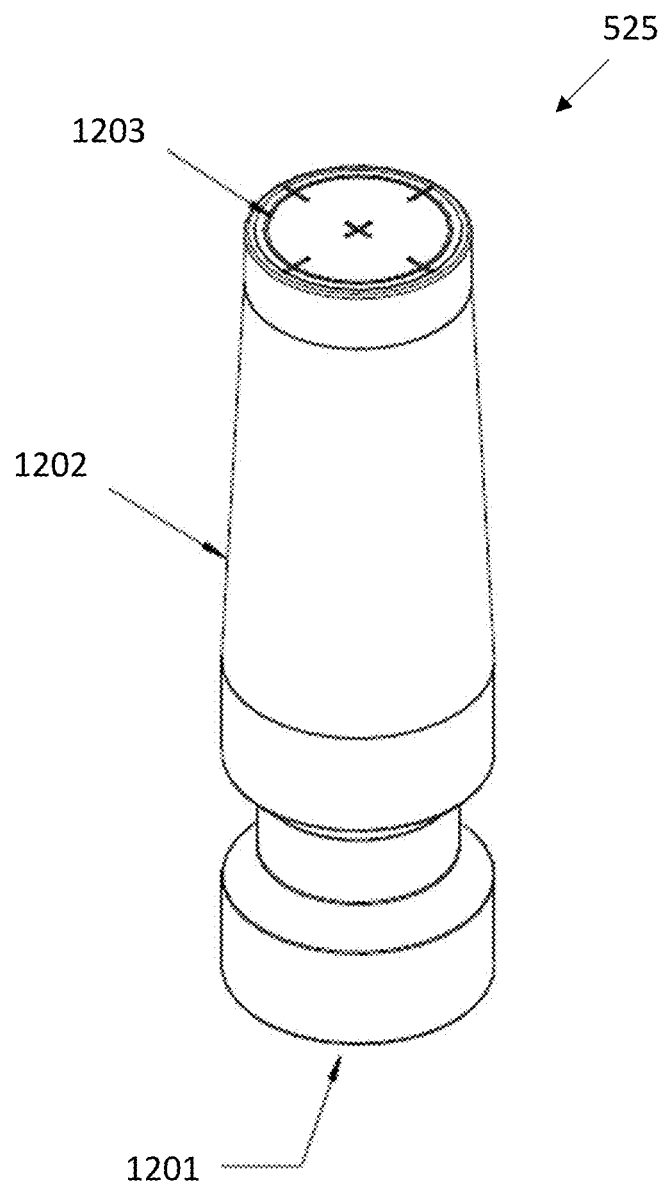
FIG. 12 depicts an example of a marker/target according to one or more embodiments.

FIG. 12 depicts an example structure of a marker 525 according to one or more aspects. The marker 525 includes among other components a portion 1201 that facilitate attaching/detaching the marker 525 from one or more other surfaces. In some aspects, the portion 1201 can be attached/detached using a screw mechanism. In other aspects, the portion 1201 can be attached/detached using magnets. The marker 525 further includes a portion 1202 that is reflective. In some cases, the portion 1202 can facilitate reflection only of certain wavelengths of light incident on the portion 1202. The portion 1202 facilitates the marker 525 to be used for photogrammetry and other such operations. The marker 525 can further include a portion 1204 that includes a label, for example a cross that can be aimed at.

The marker 525 can be used with surveying instrument (such as Total Station™) used for measurement and survey work for estimating points like even and vertical, and distance. The survey instrument, like total station, can be aimed at the portion 1204, for example, the center point of the cross.

Additionally, the marker 525 can be used for photogrammetry operations. For Photogrammetry, the marker 525 can be extracted as feature within an image that is captured if the reflective portion 1202 is captured. In some aspects, if multiple markers 525 are detected in the image, and positions of the markers can be determined, the position of the camera can be computed.

In some aspects, the marker 525 can be coupled with additional objects such as a ring member that is described in the U.S. Pat. No. 10,360,727, which is incorporated herein in its entirety by reference. The ring member and the marker 525 can be coupled using the portion 1201 in some aspects, for example, by screwing the marker 525 onto the ring member (or vice versa) or coupling the marker 525 with the ring member by magnetism.

Using the point cloud generated by the laser scanner 505, a user can create a layout plan in a digital tool to mark certain points with the one or more markers 525. The locations in which the one or more markers 525 are placed can be dependent on which points within the environment 500 the user deems as desired reference points. Technical solutions herein provide additional advantages in environments where the environment changes frequently, such as a construction site or a factory that is reconfigured often.

In addition, the point cloud generated by the laser scanner 505 can include the position of one or more features of the environment 500. For example, the features of the environment 500 can include positions of objects, corners, walls, doors, windows, furniture, beams, pipes, electrical wiring, industrial equipment, and other such features of the environment 500.

Figure 5B:
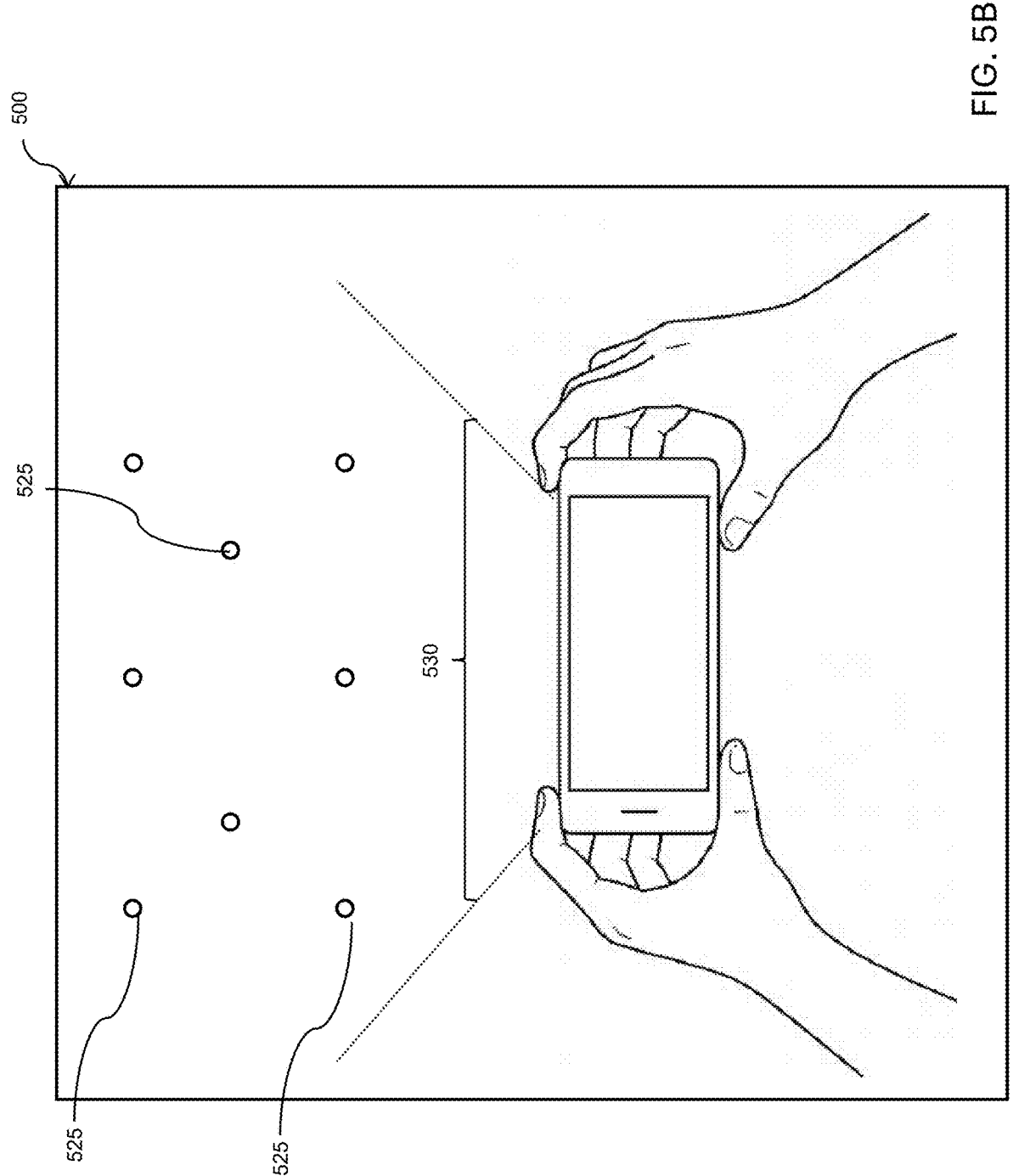
FIG. 5B illustrates a camera used to capture an image of an environment according to an embodiment.

When a photogrammetry camera or a mobile device having a camera 535 (e.g., a mobile phone) captures an image of the environment 500 (see FIG. 5B) within a field of view (FOV) 530, the reference points can be identified. These reference points can be compared with a reference system with known measurements, i.e., a "Golden Model," or a "digital twin," a reference model or an ideal model. In an embodiment, the Golden Model is created from the point cloud generated by the laser scanner 505. A position of the photogrammetry camera or the mobile device can be calculated with six-degrees of freedom and stored inside the obtained image. The image can be uploaded to a digital platform, for example, a web-share cloud, and used as additional information when generating a digital twin of environment 500, or a link between the digital twin and environment 500. The digital twin can be a representation (e.g., a 3D model) of the factory/building having focal points (locations where markers had been placed) placed within the 3D model. In the exemplary embodiment, the digital twin is created from the point cloud generated by the laser scanner 505, or may be the point cloud generated by the laser scanner 505.

The digital platform can display the 3D model on a computer, or to the user or another individual when located in environment 500, i.e., on site, by projecting the locations of the one or more markers 525 within environment 500. It should be appreciated that at least some portions of the environment 500 may change over time. For example, where the environment 500 is a manufacturing environment, the type and placement of equipment within the environment 500 may be moved or changed. Thus, embodiments provided herein provide advantages in allowing a viewer of the digital twin to view images of the environment 500 as it has existed over time, rather than a static model from when the environment 500 was scanned by the laser scanner 505. Further, embodiments described herein facilitate to update the digital twin periodically, either on a predetermined schedule or on an ad-hoc basis. In one or more embodiments, the digital twin is updated in response to detection of one or more changes to the environment 500 since the last creation/update of the digital twin. Embodiments described herein facilitate detecting such changes using reduced or minimal resources, such as a 2D camera (instead of using an expensive and time-intensive 3D scanner). The detected change(s) is analyzed, and if the detected change(s) is at least of a predetermined magnitude, a resource-intensive scan is initiated. The resource-intensive scan is performed only on a limited portion of the environment 500, where the change(s) is detected. The resource-intensive scan is used to update the digital twin. The specific region that is to be scanned using resource-intensive scanning is detected by determining a location and orientation of the change-detection equipment, such as the 2D camera, in the environment 500 and further identifying the corresponding region to be updated in the digital twin.

Figure 7A:
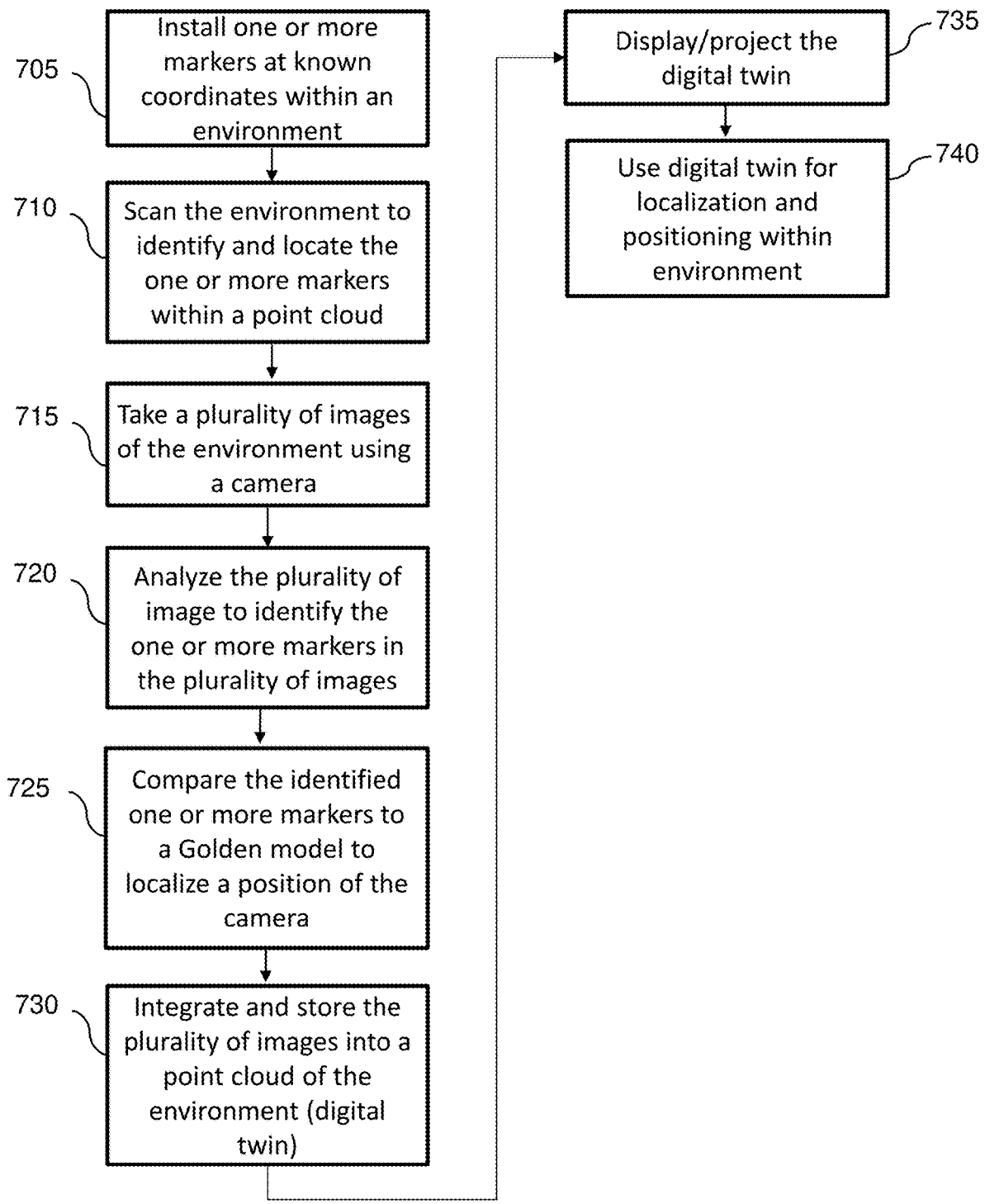
FIG. 7A illustrates a flow diagram illustrating a method for updating a point cloud of an environment having markers according to an embodiment.

FIG. 7A is a flow diagram illustrating a method of providing image localization using a reference system. At block 705, one or more markers can be installed at one or more locations within an environment. At block 710, the environment can be scanned to identify and locate the one or more markers within a point cloud. Alternatively, the locations of the one or more markers can be measured, e.g., with a laser tracker, and inserted into an existing point cloud or Golden Model. At block 715, a photogrammetry camera or a mobile device can be used to obtain one or more images of the environment. At block 720, controller/computer can analyze the one or more images to identify each of the one or more markers in the environment and an associated location for each of the one or more markers within the point cloud or digital twin. At block 725, controller/computer can compare the identified one or more markers to a known reference system in order to localize a position of the photogrammetry camera or the mobile device. At block 730, the controller/computer can integrate the one or more images into a point cloud of the environment, which is then stored. At block 735, the digital twin can be displayed and/or projected to a user. At block 740, the digital twin can be used for planning updates to the environment, for example, a representation of equipment layout/placement, etc. It should be appreciated that this allows for the automatic or semi-automatic updating of the images within the digital twin over time as the environment changes.

Figure 7B:
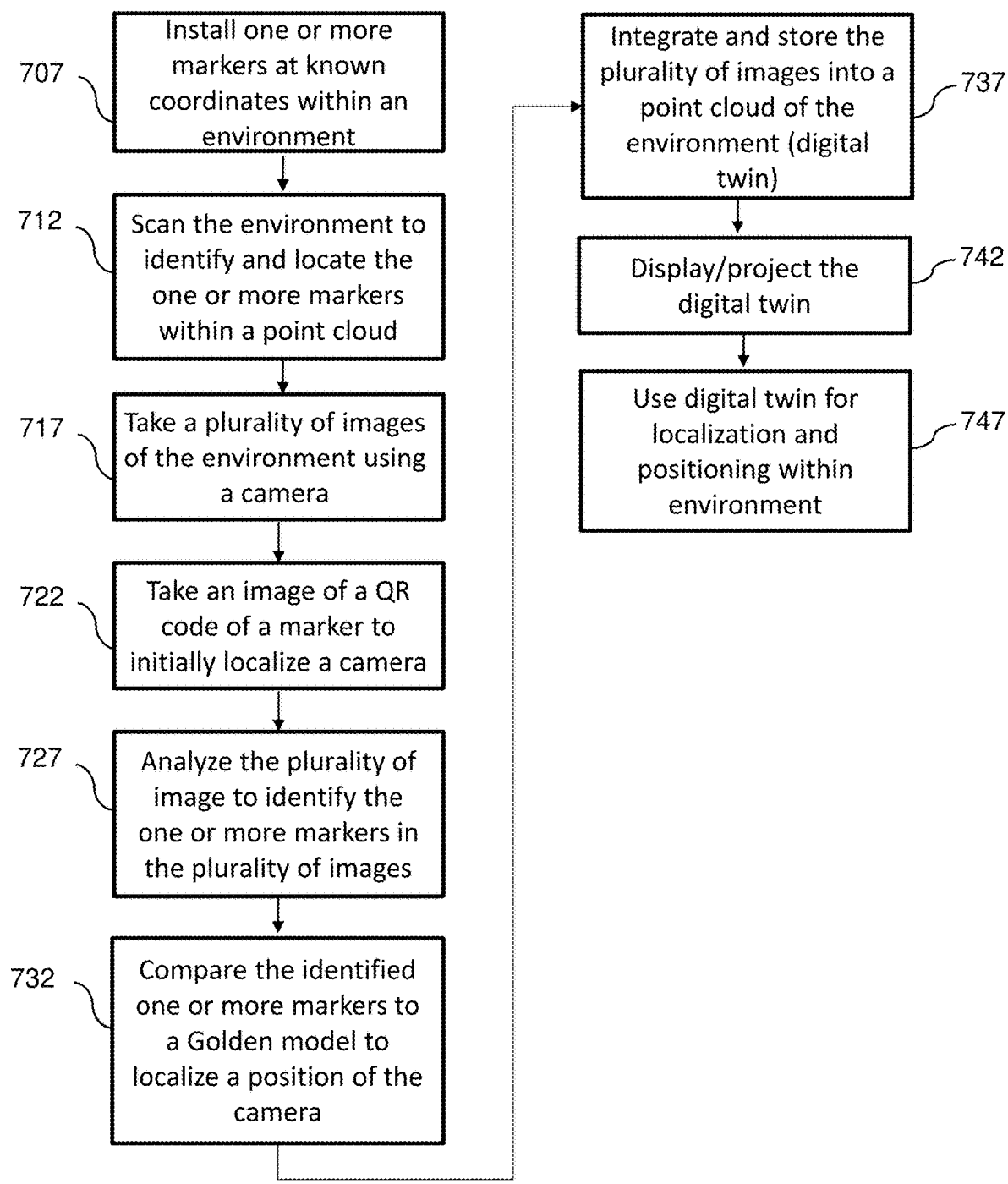
FIG. 7B illustrates a flow diagram illustrating a method for updating a point cloud of an environment having markers according to an embodiment.

FIG. 7B is a flow diagram illustrating a method of providing image localization using a reference system. At block 707, one or more markers can be installed at one or more locations within an environment. At block 712, the environment can be scanned to identify and locate the one or more markers within a point cloud. Alternatively, the locations of the one or more markers can be measured, e.g., with a laser tracker, and inserted into an existing point cloud or Golden Model. At block 717, a photogrammetry camera or a mobile device can be used to obtain one or more images of the environment. At block 722, an image of a QR code of a marker of the one or more markers can be taken and used to assist in localizing the photogrammetry camera or the mobile device within the environment. For example, a user can scan the QR code and subsequently take pictures in the environment in which the target is in the image, or the user can take pictures in the environment and subsequently scan the QR code. At block 727, a controller/computer can analyze the one or more images to identify each of the one or more markers in the environment and an associated location for each of the one or more markers. At block 732, the controller/computer can compare the identified one or more markers to a known reference system in order to localize a position of the photogrammetry camera or the mobile device within the environment. At block 737, the controller/computer can integrate the one or more images into a point cloud of the environment (digital twin), which is then stored. At block 742, the digital twin can be displayed and/or projected to a user. At block 747, the digital twin can be used for planning updates to the environment, for example, equipment layout/placement, etc.

Figure 7C:
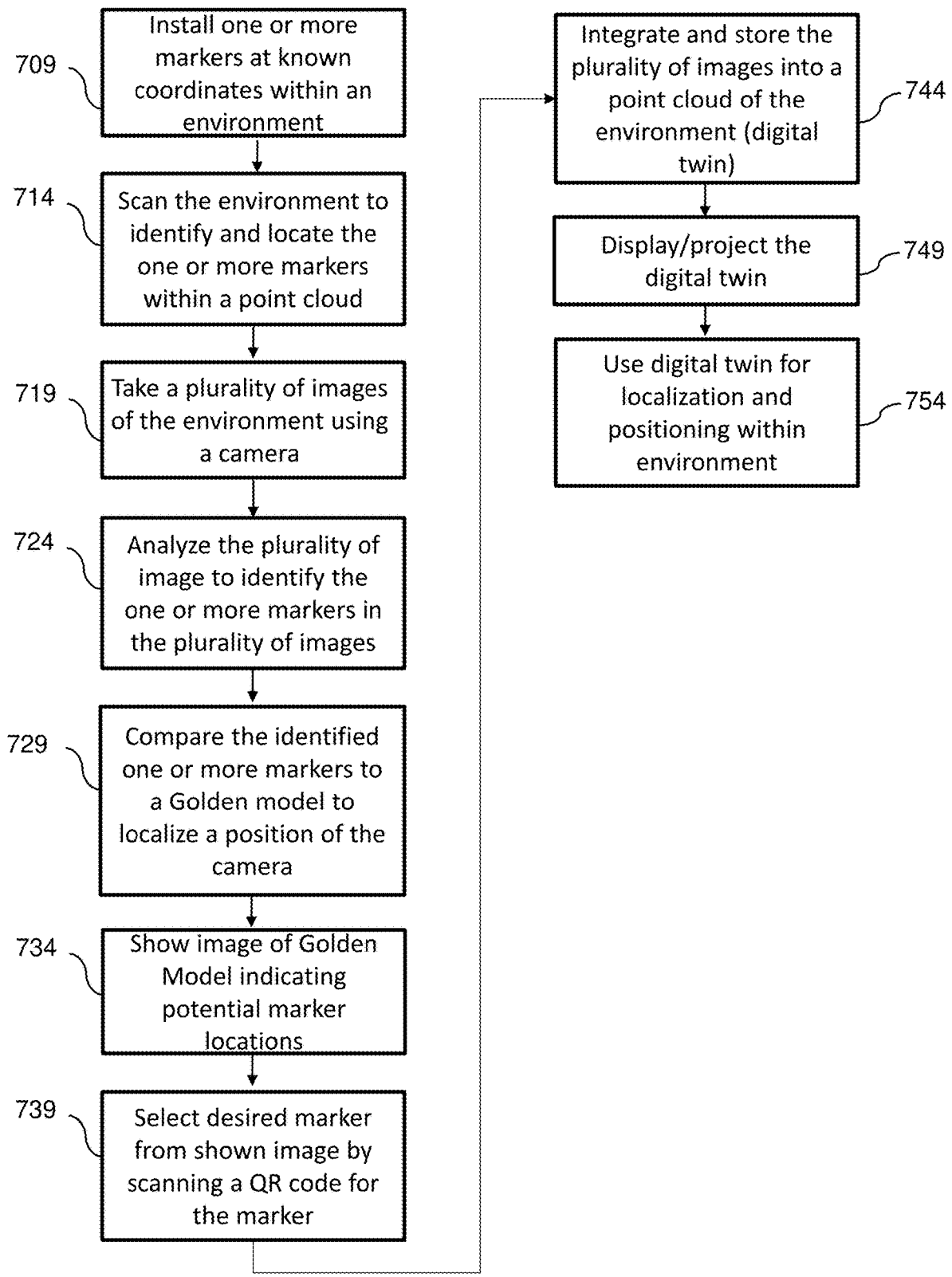
FIG. 7C illustrates a flow diagram illustrating a method for updating a point cloud of an environment having markers according to an embodiment.

FIG. 7C is a flow diagram illustrating a method of providing image localization using a reference system. At block 709, one or more markers can be installed at one or more locations within an environment. At block 714, the environment can be scanned to identify and locate the one or more markers within a point cloud. Alternatively, the locations of the one or more markers can be measured, e.g., with a laser tracker, and inserted into an existing point cloud or Golden Model. At block 719, a photogrammetry camera or a mobile device can be used to obtain one or more images of the environment. At block 724, a controller/computer can analyze the one or more images to identify each of the one or more markers in the environment and an associated location for each of the one or more markers. At block 729, the controller/computer can compare the identified one or more markers to a known reference system in order to localize a position of the photogrammetry camera or the mobile device.

At block 734, the known reference system can be displayed and indicate possible locations for the one or more markers. At block 739, a user can select a displayed marker, for example, by scanning a QR code of the selected marker. At block 744, the scanner can integrate the one or more images into a point cloud of the environment (digital twin), which is then stored. At block 749, the digital twin can be displayed and/or projected to a user. At block 754, the digital twin can be used for planning updates to the environment, for example, equipment layout/placement, etc.

Accordingly, the embodiments disclosed herein describe a system that can localize active capturing devices inside an environment with a reference system and enable users to project digital information back to reality. Localization can be established using a 2D image or 360-degree panoramic image based on known reference points. Projection of digital data back to reality can occur using, for example, a laser scanner or laser pointer.

The system disclosed herein can take an image. Markers or targets of a reference system are identified as key reference points within the image. The key reference points are then compared with known coordinates of the reference system and the position of the device is calculated and stored inside the image thereby creating a digital twin.

The system disclosed herein can be used in a variety of circumstances. For example, a reference system can be installed inside a factory or building. Alternatively, or in addition, the reference system can be installed remotely, for example, using cloud computing platform/technology.

Figure 8:
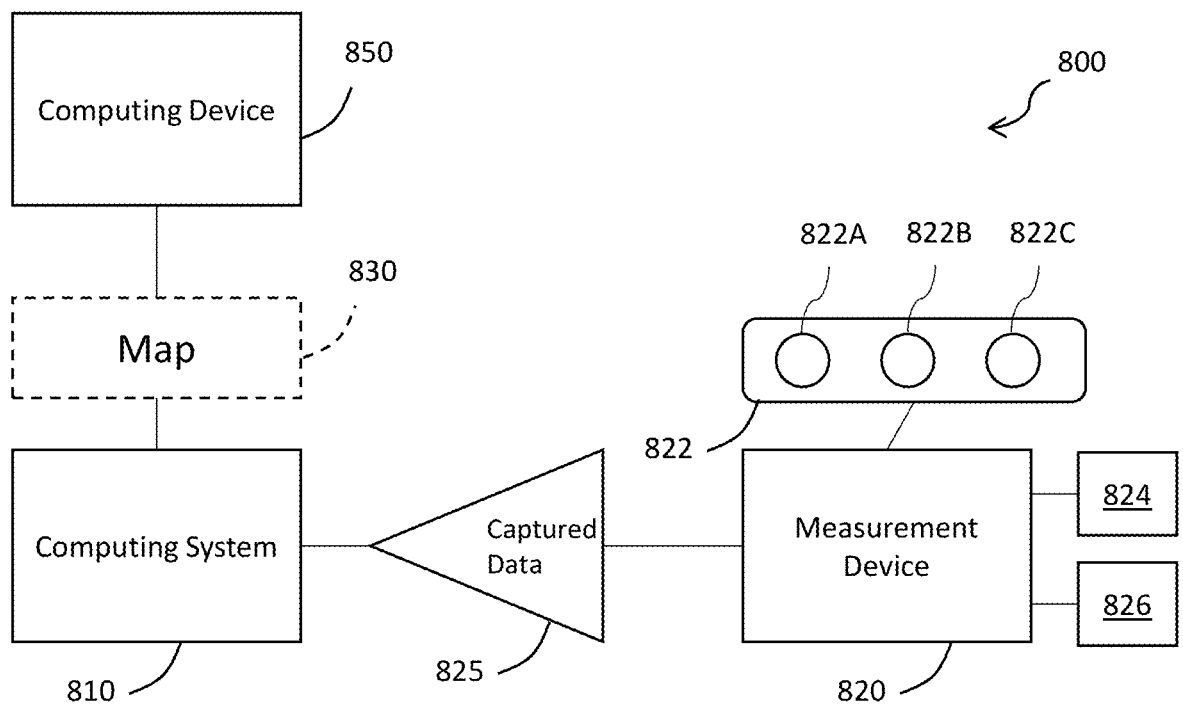
FIG. 8 depicts a block diagram of a measurement system to store a digital twin of an environment according to one or more embodiments.

FIG. 8 depicts a block diagram of a measurement system to store a digital twin of an environment according to one or more embodiments. The measurement system 800 includes a computing system 810 coupled with a measurement device 820. The coupling facilitates wired and/or wireless communication between the computing system 810 and the measurement device 820. The measurement device 820 can include a laser tracker, a 2D scanner, a 3D scanner, or any other measurement device or a combination thereof. The captured data 825 from the measurement device 820 includes measurements of a portion from the environment. The captured data 825 is transmitted to the computing system 810 for storage. The computing device 810 can store the captured data 825 locally, i.e., in a storage device in the computing device 810 itself, or remotely, i.e., in a storage device that is part of another computing device 850. The computing device 850 can be a computer server, or any other type of computing device that facilitates remote storage and processing of the captured data 825.

In one or more embodiments, the captured data 825 can be used to generate a map 830 of the environment in which the measurement device 820 is being moved. The map 830 can include 3D representation, 2D representation, annotations, images, and all other digital representations of the environment 500. The computing device 810 and/or the computing device 850 can generate the map 830. The map 830 can be generated by combining several instances of the captured data 825, for example, submaps. Each submap can be generated using SLAM, which includes generating one or more submaps corresponding to one or more portions of the environment. The submaps are generated using the one or more sets of measurements from the sets of sensors 822. The submaps are further combined by the SLAM algorithm to generate the map 830. The map 830 is the digital twin of the environment 500 in one or more embodiments.

The captured data 825 can include one or more point clouds, distance of each point in the point cloud(s) from the measurement device 820, color information at each point, radiance information at each point, and other such sensor data captured by the set of sensors 822 that is equipped on the measurement device 820. For example, the sensors 822 can include a LIDAR 822A, a depth camera 822B, a camera 822C, etc.

The measurement device 820 can also include an inertial measurement unit (IMU) 826 to keep track of a pose, including a 3D orientation, of the measurement device 820. Alternatively, or in addition, the captured data 825 the pose can be extrapolated by using the sensor data from sensors 822, the IMU 826, and/or from sensors besides the range finders.

It should be noted that a "submap" is a representation of a portion of the environment and that the map 830 of the environment includes several such submaps "stitched" together. Stitching the maps together includes determining one or more landmarks on each submap that is captured and aligning and registering the submaps with each other to generate the map 830. In turn, generating each submap includes combining or stitching one or more sets of captured data 825 from the measurement device 820. Combining two or more captured data 825 requires matching, or registering one or more landmarks in the captured data 825 being combined.

Here, a "landmark" is a feature that can be detected in the captured data 825, and which can be used to register a point from a first captured data 825 with a point from a second captured data 825 being combined. For example, the landmark can facilitate registering a 3D point cloud with another 3D point cloud or to register an image with another image. Here, the registration can be done by detecting the same landmark in the two captured data 825 (images, point clouds, etc.) that are to be registered with each other. A landmark can include, but is not limited to features such as a doorknob, a door, a lamp, a fire extinguisher, or any other such identification mark that is not moved during the scanning of the environment. The landmarks can also include stairs, windows, decorative items (e.g., plant, picture-frame, etc.), furniture, or any other such structural or stationary objects. In addition to such "naturally" occurring features, i.e., features that are already present in the environment being scanned, landmarks can also include "artificial" landmarks that are added by the operator of the measurement device 820. Such artificial landmarks can include identification marks that can be reliably captured and used by the measurement device 820. Examples of artificial landmarks can include predetermined markers, such as labels of known dimensions and patterns, e.g., a checkerboard pattern, a target sign, spheres, or other such preconfigured markers.

In the case of some of the measurement devices 820, such as a volume scanner, the computing device 810, 850 can implement SLAM while building the scan to prevent the measurement device 820 from losing track of where it is by virtue of its motion uncertainty because there is no presence of an existing map of the environment (the map is being generated simultaneously). It should be noted that in the case of some types of the measurement devices 820, SLAM is not performed. For example, in the case of a laser tracker, the captured data 825 from the measurement device 820 is stored, without performing SLAM.

The measurement system 800 can be used as the reference system to create a digital twin of the environment. As can be noted, creating a geometrical digital twin of a large facility, such as a factory, a warehouse, an office building, or other such environments is a time- and cost-intensive task. However, as the environment is updated, reflecting such changes in the corresponding digital twin is cost prohibitive. A regular update of a digital twin for large facilities is not typically performed for such reasons. Hence, the digital twin is not updated in such cases resulting in an outdated digital twin of the environment 500. Therefore, at a later stage, the digital twin cannot be used for planning updates to the environment. Instead, either the facility is scanned in entirety (again) at some point in time or scanned partially if modifications are planned, and such a partial scan is stored as a separate representation of that portion. The latter results in an unreliable digital twin, because multiple representations with different time stamps exists. In the former, between two large scanning projects of the entire facility, the real state of the facility and its digital twin diverge more and more. Multiple problems arise from this situation, such as planning based on the digital twin is unreliable, other resources such as 2D plans are used for planning, and typically, a real person has to check the scene in the real world (i.e., resources and time expensed). Eventually, in such cases, the model of the digital twin is discarded and no longer used. That is, in the end, the planners keep using their old-fashioned layout plans which have to be updated as well and does not allow 3D planning.

Technical solutions described herein address such technical challenges. The technical solutions described herein facilitate detecting changes (e.g., new objects, structural changes, etc.) in the environment, and in response, triggering a new scan in the region of interest. The new scan captures the changes. The new scan is uploaded/added to the digital twin. In one or more embodiments, the new scan replaces an existing part of the digital twin. For example, the digital twin can include multiple files, each file representing a specific portion/region of the environment 500. In such case, a specific file is replaced with the new scan. Alternatively, or in addition, the digital twin includes multiple point clouds, each point cloud representing a specific portion/region of the environment 500. In such a case, one or more point clouds of the digital twin are replaced by the new scan. In this manner, the digital twin is partially revised and kept updated by using the technical solutions described herein.

Figure 9:
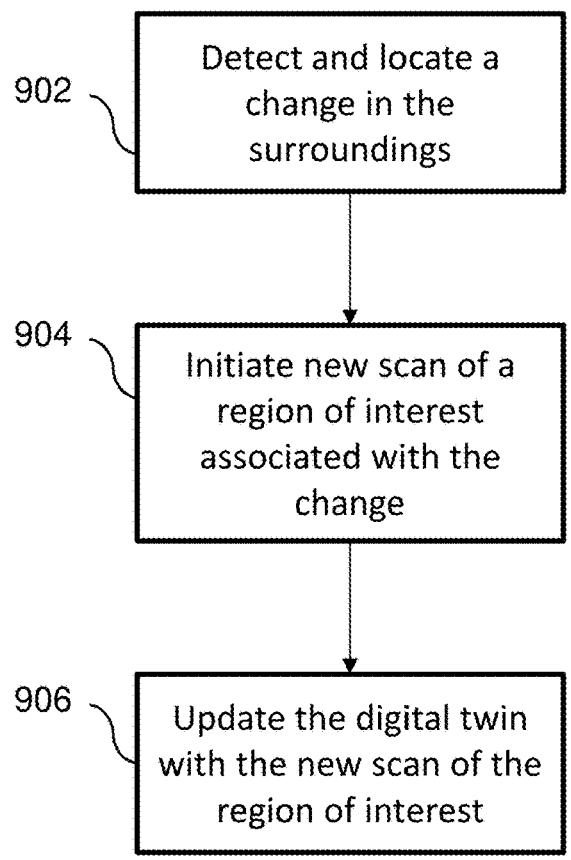
FIG. 9 depicts a flowchart of a method for updating a digital twin of an environment according to one or more embodiments.

FIG. 9 depicts a flowchart of a method for updating a digital twin of an environment according to one or more embodiments. A method 900 for updating the digital twin includes recognition and locating of changes in the environment 500, at block 902. The locating of the change includes determining a region of interest in which the change has been detected. Further, the method 900 includes initiating a new scan of the region of interest in response, at block 904. In one or more embodiments, the scan is performed when the detected change is "too big," i.e., exceeds a predetermined threshold. Further, the method 900 includes updating the existing digital twin with the new scan of the region of interest, at block 906.

Figure 10:
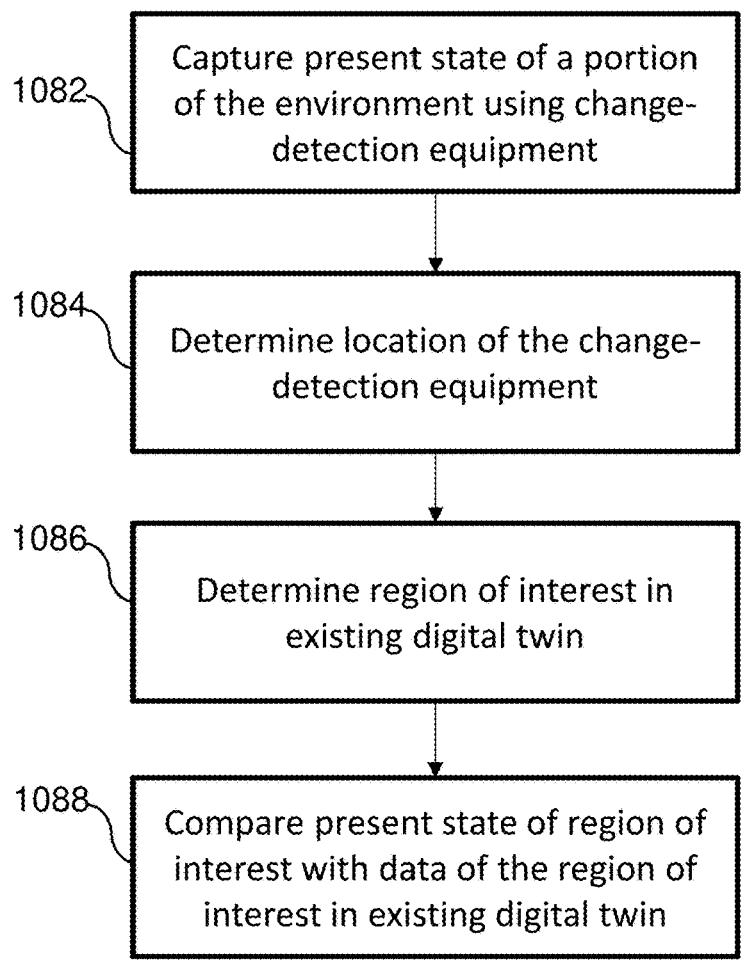
FIG. 10 depicts a flowchart of a method for detecting a change in the surroundings compared to an existing digital twin according to one or more embodiments.
Figure 11A:
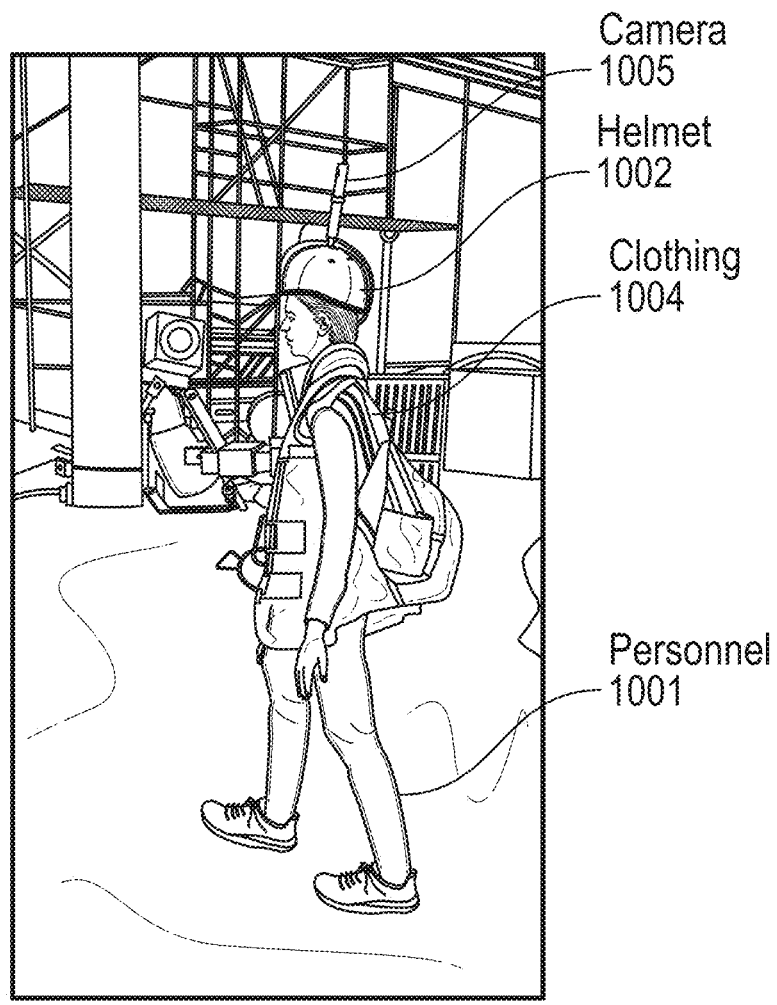
FIG. 11A depicts a change-equipment device mounted on a personnel according to one or more embodiments.

FIG. 10 depicts a flowchart of a method for detecting a change in the surroundings compared to an existing digital twin according to one or more embodiments. Recognizing the change is based on the existing digital twin, which is used as a ground truth to compare with the present state of the environment 500. Method 1000 includes capturing present state of a portion of the environment 500, at block 1082. Getting data of the present state of the environment 500 is performed using techniques that are not resource and time intensive. For example, images taken with a change-detection equipment, for example, a low-cost consumer-grade camera can be used. In one or more embodiments, to get such images from the environment 500, the camera can be mounted on personnel who regularly operates in the environment 500. For example, as depicted in FIG. 11A, the camera 1005 can be mounted on a helmet 1002 or the clothing 1004 of the personnel 1001 in the environment. Accordingly, as the personnel 1001 moves around the environment 500, the present state of the one or more portions in which s/he moves is captured. It is understood that the camera 1005 can be associated with the personnel 1001 in any other manner than that is depicted in FIG. 11A. Further, it should be noted that although single personnel 1001 is depicted, in one or more embodiments, multiple personnel are equipped with the camera 1005 that capture images of the different portions of the environment 500.

Figure 11B:
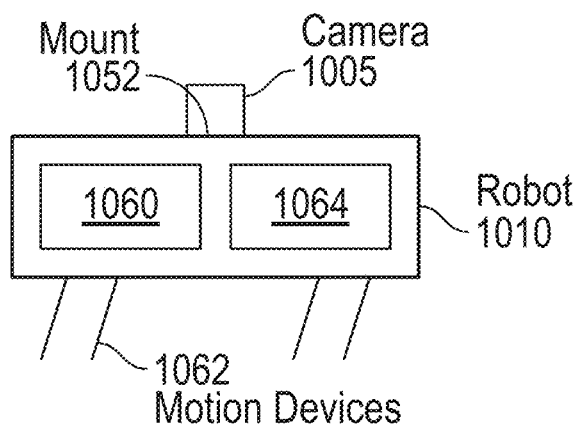
FIG. 11B depicts a change-detection equipment mounted on a transportation-robot according to one or more embodiments.

In other embodiments, the camera 1005 is equipped on a mobile or transporter robot 1010 (see FIG. 11B), for example, SPOT® from BOSTON DYNAMICS®, using a mount 1052. It should be noted that while FIG. 11B depicts a single camera 1005 mounted on the transporter robot 1010, in other embodiments, the transporter robot 1010 can be fixed with multiple cameras 1005. The cameras 1005 can be communicating with the computing device 810, for example, to receive commands from the computing device 810 and/or to transmit captured data to the computing device 910.

The mount 1052 facilitates the camera 1005 to change pose using a motion controller (not shown). For example, the motion controller can cause the mount 1052 to rotate around its own vertical axis or horizontal axis to capture images from 360 degrees around the robot 1010. The position of the mount 1052 in relation to the transporter robot 1010 is fixed. Accordingly, given the position of the transporter robot 1010 in the environment 500, the position of the camera 1005 can be determined.

The transporter robot 1010 includes a motion controller 1060 that controls the movement of the transporter robot 1010 through the surrounding environment. The motion controller 1060, in one or more embodiments, sends commands to one or more motion devices 1062 of the transporter robot 1010. The motion devices 1062 can be robotic legs, wheels, or any other such motion devices that facilitate the transporter robot 1010 to move in the surrounding environment. The transporter robot 1010 can transport the mounted camera(s) 1005 around the surrounding environment 500 accordingly. The motion device 1062 can cause the transporter robot 1010 to sway, shake, vibrate, etc., which in turn causes instability for the camera 1005 that is mounted on the transporter robot 1010. The transporter robot 1010 can include an IMU 1064 that monitors the orientation of one or more components of the transporter robot 1010, and particularly, the mount 1052 on which the camera 1005 is fixed. In one or more embodiments, the IMU 1064 can be queried to determine the orientation of the motion devices 1062, the mount 1052, or any other component of the transporter robot 1010. In one or more embodiments, the transporter robot 1010 can be remotely controlled, for example, by the computer system 810 and/or the computer device 850. The transporter robot 1010 can be commanded to move along a predetermined path at a predetermined frequency and speed to capture the present state of the environment 500 on a periodic basis.

The camera 1005 continuously sends images to the computing system 810, and/or the computing device 850. In one or more examples, the camera 1005 uses a wide-angle lens to capture 360-degree images of the surrounding images.

Referring to the flowchart in FIG. 10, a location of the change-detection equipment is determined, at block 1084. It is understood that although the embodiments described herein use a 2D camera 1005 as the change-detection equipment, in other embodiments the change-detection equipment can include a 2D scanner or any other such measurement device that cost lesser (time, resources, economic, etc.) than the scan for the digital twin (for example, 3D laser scanner). The location of the change-detection equipment is determined based on a location-detection sensor in the change-equipment device, e.g., camera 1005. For example, the sensor can be a wireless network device that is used to connect to a network, such as a 3G/4G/5G network, a WIFI network, or any other such a network.

Alternatively, the location can be determined based on the data captured by the change-equipment device 1005. For example, images captured by the camera 1005 are analyzed to detect one or more features, e.g., landmarks. The detected features are compared with one or more features in the images (or other type of data) in the digital twin to identify a matching region in the digital twin. For example, the images from the camera 1005 detect a refrigeration unit, an industrial robot, a fire-extinguisher, a window, or any other such landmark. Alternatively, or in addition, the detected landmarks can include artificial landmarks, such as markers, QR codes, or other such objects that are placed at predetermined locations. The corresponding portions of the digital twin are identified that include the same landmark(s). For example, if the landmark is a refrigeration unit, the portion of the digital twin that represents the room/region/portion that includes the refrigeration unit is deemed to be the location of the change-detection equipment. Alternatively, the personnel 1001, or the transporter robot 1010 can indicate a location of the change-equipment device using an interface, such as a graphical user interface, an application programming interface, etc. Various other techniques can be used to determine a location of the change-equipment device in the environment 500.

Further, a region of interest for the captured present state is determined, at block 1086. The region of interest of the digital twin that is identified can be a file that includes digital representation of the environment 500 that is captured from the identified location. Alternatively, or in addition, the region of interest is the digital representation of the environment 500 that includes the location. In one or more embodiments, the region of interest that is identified can be a collection of data structures from a database or any other form of stored data. For example, the collection of data structures can include one or more point clouds, one or more images, one or more annotations, or any other such data that has been captured to represent the region of interest in the digital twin. In one or more embodiments, one or more files that store such data structures are identified as the region of interest.

Further, the data captured by the change-detection equipment as the present state of the region of interest is compared with the existing data of the region of interest in the digital twin, at block 1088. For example, images from the camera 1005 are compared, using image processing algorithms, with the existing (panorama)-images from the digital twin.

In one or more embodiments, performing the comparison includes generating a first panoramic image of the ground truth from the location of the change-detection equipment using the stored data in the digital twin. Generating the first panoramic image includes setting the location of the change-detection equipment as an origin and simulating a panoramic image capture from that origin in the digital twin. The first panoramic image is then compared with the panoramic image that is captured by the change-detection equipment, such as the camera 1005. The comparison can include segmenting the two panoramic images to perform a line-detection (e.g., using an edge detection algorithm).

Technical effects and benefits of the disclosed embodiments include, but are not limited to providing a system where images of an environment can be automatically or semi-automatically updated in a digital model or point cloud at a location within the digital model that matches the actual location and orientation where the image was acquired.

Terms such as processor, controller, computer, DSP, FPGA are understood in this document to mean a computing device that may be located within an instrument, distributed in multiple elements throughout an instrument, or placed external to an instrument. The line segments in the two panoramic images are then compared to determine a match-score that indicates a similarity (or difference) in the two images. In one or more embodiments, an affine invariant detection can also be performed on the two panoramic images to compensate for any differences in viewpoints from which the two panoramic images are captured.

In one or more embodiments, consider A to be the panoramic image of the present state of the environment 500, i.e., the image captured by the camera 1005 mounted on the personnel 1001 or transport-robot 1010. Further, consider that images B1, B2, ..., Bn represent the ground truth (panorama) images in the digital twin. Changes between the two images are then detected by comparing A pairwise with B1, B2, ..., Bn. Affine invariant detectors can be used to match two images taken from different viewpoints. This gives a transformation from A to Bi. Note that here, A and Bi are images from the same region of interest.

Using the transformation, a virtual panorama image from the digital twin (using B1, B2, ..., Bn) from the same location as A is captured (e.g., feature available in software from FARO®). The two images from the same location are used to determine the match-score, i.e., discrepancies between the ground truth and the present state. In one or more embodiments, the match-score is determined using the Structural Similarity Index (SSIM).

If the match-score is below a predetermined threshold, i.e., the difference in the two images is above a predetermined threshold, the new scan is initiated, at block 904 (FIG. 9). Initiating a new scan includes notifying the personnel 1001 (or another personnel), the transportation-robot 1010 (or another transportation-robot) to perform a resource-intensive scan of the region of interest. In one or more embodiments, the notification includes a location to be used to perform the new scan. For example, the location of the change-detection equipment can be specified to perform the new scan. The resource-intensive scan is performed using the 3D scanner 20 or any other such measurement device(s).

In one or more embodiments, the notification can also include an orientation to be used to perform the new scan. The orientation can specify a direction in which the detected change is present from the specified location. Such information can reduce the costs required to perform the new scan. Alternatively, or in addition, the notification can identify the region of interest that is to be scanned. The new scan can then be performed to ensure that the region of interest is captured in the new scan.

In one or more embodiments, the notification is an electronic message, such as an email, an instant message, or any other type of electronic message to an operator that performs the resource-intensive new scan. The electronic message can include specific coordinates and the orientation from which to perform the new scan. Alternatively, or in addition, the electronic message includes one or more images of the region of interest that is to be scanned. In one or more embodiments, the notification includes one or more commands that are sent to an automated transport-robot 1010 that is equipped with the resource-intensive scanning equipment, such as the 3D scanner. The one or more commands instruct the transport-robot 1010 to be located at a particular position in the environment 500 and at a particular orientation to capture the region of interest.

In one or more embodiments, the notification indicates one or more landmarks that are to be captured in the new scan. The landmarks indicated are determined based on those that are used to register the existing data in the digital twin. For example, the existing data in the digital twin for the region of interest can use a specific set of landmarks to register one or more point clouds representing the region of interest with the rest of the point clouds in the digital twin. In such a case, the landmarks are identified so that the new scan also includes the landmarks for registering the new scan with the digital twin.

Further, at block 906, the new scan of the region of interest is captured and incorporated into the digital twin. The digital twin is updated with the new scan. The updating can include replacing the existing data of the region of interest with the new scan. The new scan is registered with the rest of the digital twin using the one or more landmarks in the new scan. The landmarks include those that are identified in the notification. The registration can be performed using one or more known techniques such as, Cloud2Cloud registration, or any other registration of point clouds, images, etc.

In this manner, the digital twin is updated in a continuous manner, and in parts as changes to the environment 500 are made. The digital twin can, accordingly, be readily used for planning and other purposes. The embodiments of the technical solutions described herein facilitate such a continuous update of the digital twin on a periodic basis or ad hoc when a change is detected. Because the change-detection is performed with less resources than the resource-intensive scanning process, the digital twin can be maintained in an updated state in this manner.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A camera system for updating a three-dimensional (3D) digital representation of an environment, the camera system comprising:
    a change-detection device having a camera that captures two-dimensional (2D) images of environments;
    a scanning device that captures 3D coordinate data of objects within environments that are used to generate 3D digital representations of objects; and
    at least one processor responsive to executable computer instructions to exclusively initiate:
        capturing a 2D image of at least a portion of an environment using the change-detection device;
        identifying the portion in a 3D digital representation generated from the 3D coordinate data measured by the scanning device that corresponds to the portion in the 2D image captured using the change-detection device;
        comparing a difference between the 2D image of the portion and the 3D digital representation of the portion against a predetermined threshold in order to detect a change in the portion of the environment between a time of the capturing and a time of the 3D digital representation; and
        in response to the change being above the predetermined threshold:
            capturing a new scan of the portion using the scanning device; and
            updating the 3D digital representation of the portion by replacing the portion of the 3D digital representation with the new scan of the portion; and
            outputting an updated 3D digital representation of the environment based on the updating.

2. The camera system of claim 1, wherein the 3D digital representation of the environment comprises 3D coordinate points on surfaces of objects within the environment.

3. The camera system of claim 1, wherein identifying the portion in the 3D digital representation further comprises identifying at least one landmark in the environment captured within the 2D image and a digital twin of the at least one landmark in the 3D digital representation.

4. The camera system of claim 3, wherein the at least one landmark includes a marker installed in the environment.

5. The camera system of claim 4, wherein the marker is a quick response (QR) code.

6. The camera system of claim 4, wherein the marker comprises a label having at least one of a known dimension and a known pattern that is captured in the 2D image.

7. The camera system of claim 4, wherein the marker comprises a reflective surface that is captured in the 2D image.

8. The camera system of claim 1, wherein identifying the portion in the 3D digital representation further comprises:
    simulating a panoramic image of the portion from a location of the change-detection device using the 3D digital representation of the environment; and
    comparing the panoramic image with the 2D image from the change-detection device.

9. The camera system of claim 1, wherein capturing the new scan of the portion comprises:
    sending a notification that includes a position and an orientation within the environment, wherein the new scan of the portion is captured by the scanning device from the position using the orientation.

10. The camera system of claim 9, wherein the notification further comprises identification of at least one landmark to be captured in the resource-intensive scan to register the resource-intensive scan with the 3D digital representation.

11. The camera system of claim 9, wherein the new scan is performed by the scanner in response to a manual initiation by an operator receiving the notification from the at least one processor.

12. The camera system of claim 9, wherein the new scan is performed by the scanner and is autonomously initiated by a robot in response to receiving the notification from the at least one processor.

13. The camera system of claim 1, wherein the change-detection device comprises at least one of:
    a photogrammetry camera; and
    a camera associated with a mobile phone.

14. The camera system of claim 1, wherein the environment comprises at least one of:
    a factory; and
    a building.

15. The camera system of claim 14, wherein the updated 3D digital representation is used to layout a place for new equipment in the environment.

16. A method performed exclusively by a processor of a camera system to automatically update three-dimensional (3D) digital representations of an environments, the method comprising:
    capturing a two-dimensional (2D) image of a portion of an environment using a change-detection device of the camera system;
    identifying the portion in a 3D digital representation generated from measurement data determined from a scan of the environment by a scanning device of the camera system, which corresponds to the portion in the 2D image captured using the change-detection device;
    comparing the 2D image of the portion of the environment and the portion in the 3D digital representation against a predetermined threshold to detect a change in the portion of the environment between a time of the 2D image and a time of the 3D digital representation;
    in response to the change exceeding the predetermined threshold:
        capturing a new scan of the portion using a scanning device;
        updating the 3D digital representation of the environment by replacing the portion in the 3D digital representation with the new scan; and outputting an updated 3D digital representation of the environment based on the updating.

17. The method of claim 16, wherein the 3D digital representation comprises 3D coordinate points measured on surfaces of the environment.

18. The method of claim 16, wherein identifying the portion in the 3D digital representation comprises locating at least one landmark within the 2D image.

19. The method of claim 18, wherein the at least one landmark each includes an artificial marker placed in the environment.

20. The method of claim 16, wherein comparing the 2D image of the portion further comprises:
  simulating a panoramic image of the portion from a location of the change-detection device using the 3D digital representation of the environment; and
  comparing the panoramic image with the 2D image captured by the change-detection device.

21. The method of claim 16, wherein capturing the new scan comprises:
  sending a notification that includes a position in the environment and an orientation, whereby the new scan of the portion is captured by the scanning device from the position using the orientation.

22. The method of claim 16, wherein the 2D camera and the scanning device share an optical axis.

* * * * *